United States Patent [19]

Jensen

[11] Patent Number: 4,997,203
[45] Date of Patent: Mar. 5, 1991

[54] TRAILER JACK

[76] Inventor: Layton W. Jensen, P.O. Box 218, Thurston, Nebr. 68062

[21] Appl. No.: 401,001

[22] Filed: Aug. 31, 1989

[51] Int. Cl.$^5$ .............................................. B60S 9/02
[52] U.S. Cl. ................................ 280/763.1; 254/419; 403/293; 403/327
[58] Field of Search ............... 280/763.1, 764.1, 765.1, 280/766.1; 254/89 R, 418, 419, 421; 296/168, 169; 403/295, 327

[56] References Cited

U.S. PATENT DOCUMENTS 3,614,064  10/1971  Bennett .................................. 254/48
4,589,632   5/1986  Smith .................................... 254/418

FOREIGN PATENT DOCUMENTS 3515489  11/1985  Fed. Rep. of Germany ... 280/763.1
1342270   9/1963  France ............................. 280/763.1
 771160   3/1957  United Kingdom ............. 280/763.1

Primary Examiner—Andres Kashnikow
Assistant Examiner—Richard M. Camby

[57] ABSTRACT

An improved attachment between a supporting jack on a trailer and the frame of the trailer. The device is based on a matching boss and socket. The device is spring loaded so as to be normally engaged but is releasable against a spring loading. It is entirely enclosed to avoid interference with its action, by any dirt, dust, grease or the like, and includes a special friction producing surface engageable between the boss and the interior of the socket to prevent vibration-caused disengagement.

8 Claims, 2 Drawing Sheets

TRAILER JACK

BACKGROUND AND SUMMARY OF THE INVENTION

This invention pertains to devices to hold the supporting jacks of a large trailer or semitrailer in place.

When a semitrailer or similar trailer is not attached to a pulling vehicle, the front end of the trailer is commonly supported by a type of jack. These jacks are usually attached in pairs to the frame of the trailer and have two positions. When they are supporting the end of the trailer, the jacks extend substantially vertically. When the pulling vehicle is joined to the trailer, each jack usually is swung 90° and then lies horizontally along the frame, and is thus raised above the ground where it will not interfere with reasonable travel.

There may be many devices designed to hold the jack in either the up position or the down position. Pin-locked devices are common. Other devices also have an exposed axle where grease and dirt may be a problem either in interfering with movement of the jack from one position to another or which may interfere with the locking mechanism by which the jack is held in either single position.

By my invention I provide a well-enclosed pivotal axis guarded from outside materials such as grit, dirt, sand or the like, and at the same time use a simple, easy method of holding and releasing the locking mechanism.

DESCRIPTION

Figure 1:
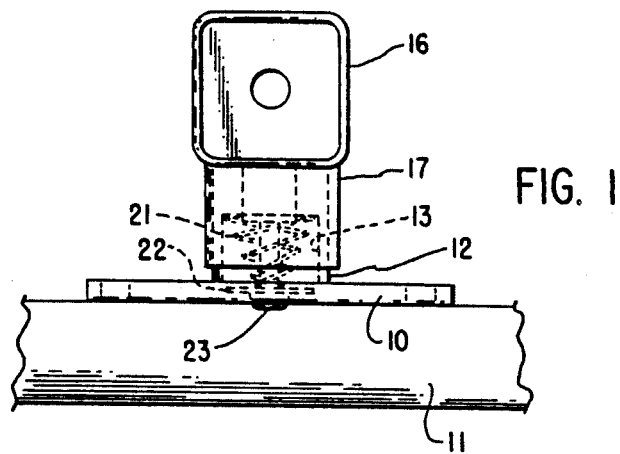
FIG. 1 is an end view of the jack in a locked position.
Figure 2:
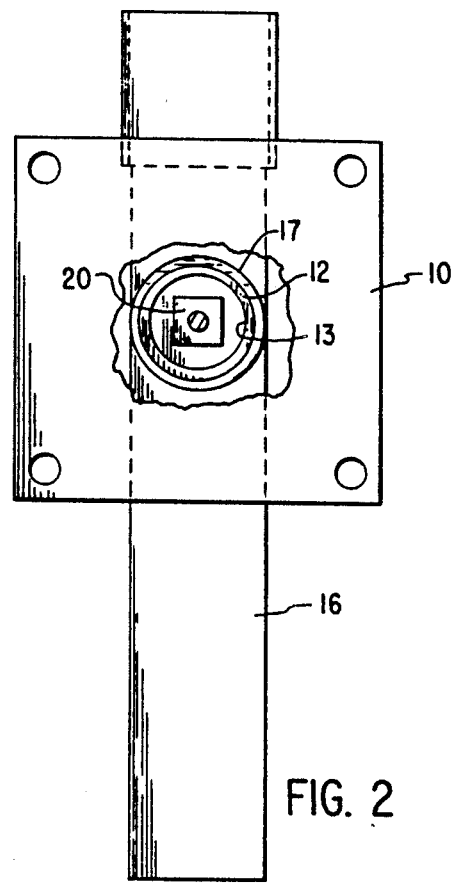
FIG. 2 is a side elevational view with part of the support plate broken away to show underlying parts, and detached from the trailer frame.
Figure 3:
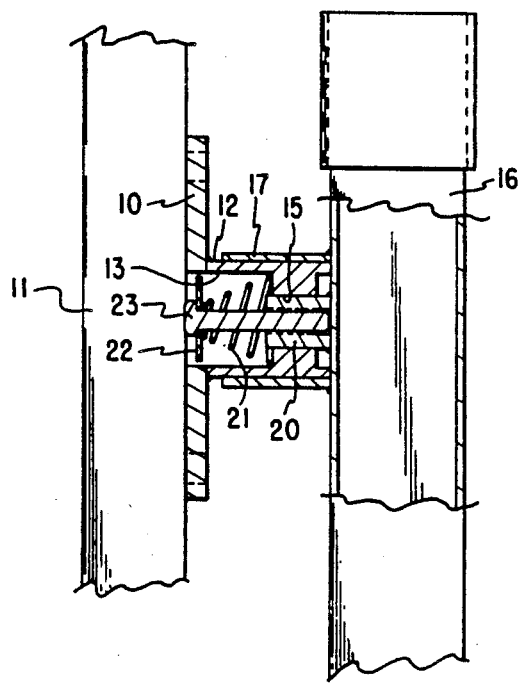
FIG. 3 is a front elevational view of the attachment means partly in section to show the operating mechanism in a locked position.
Figure 4:
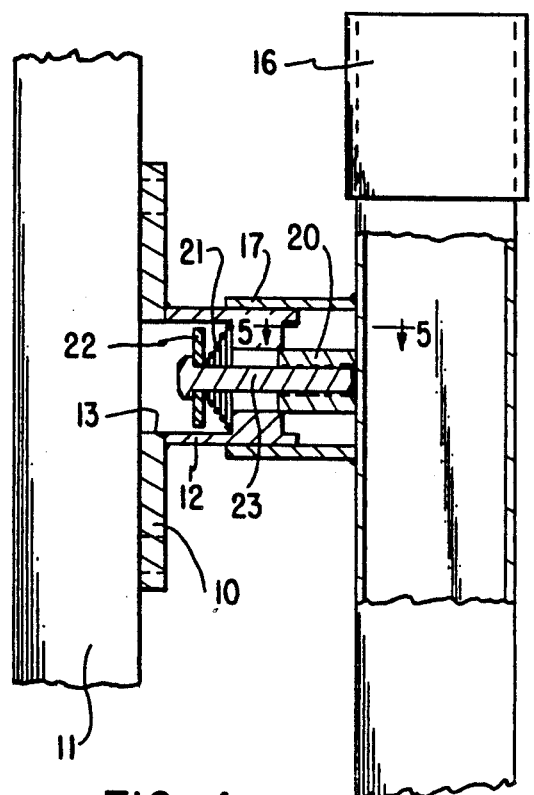
FIG. 4 is a view similar to FIG. 3 showing the mechanism in a position free from the locking so that the jack can be moved.
Figure 5:
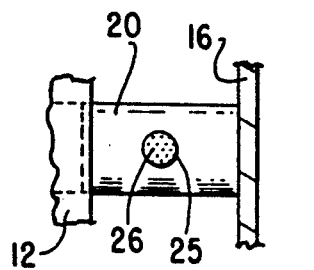
FIG. 5 is a detailed view of the peg on the jack showing the vibration locking device.
Figure 6:
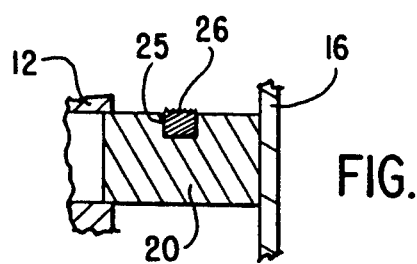
FIG. 6 is a sectional view of the parts shown in FIG. 5.

Briefly my invention comprises a releasable support device for a support jack for a trailer including mating square parts adapted to hold the jack in alternate positions horizontally and vertically. The parts are normally engaged and held in engagement by a spring, but can be disengaged against pressure of the spring to be moved to the alternate position.

More specifically, and referring to the drawings, my device includes a mounting pad 10 adapted to be fastened to the frame 11 of the trailer by any well known means. This pad has a cylindrical boss 12 formed on it extending outwardly to support the jack. On the portion of the support adjacent to the frame 11, the boss is formed with a hollow 13 in which certain operating parts, described later, are disposed. The boss is also formed to provide a square hole 15 extending completely through the remaining solid part of the boss 12.

The jack support post 16 may be of customary formation so far as all but the attachment parts are concerned. At the point of attachment, I provide a tubular extension 17 adapted to telescope over the boss 12. Thus, the telescoping engagement of these two parts, while allowing turning of one part relative to the other, also provides some load carrying capacity so the load of the frame 11 and all it supports will be transmitted to the support post 16.

While a part of that load will be carried from the boss 12 to the tubular extension 17, I also provide additional means for carrying a substantial part of the load while that same means also provides for proper alternate positioning of the post 16. This means comprises a square peg 20 adapted to slide into the hole 15 in the boss 12. The sides of the squares on both the peg 20 and the hole 15 are aligned so that when the peg 20 is inserted into the hole 15, the post will normally be in a position nearly horizontal and parallel to the frame 11. In this "up" position, the post 16 of the jack will be out of the way and the trailer can be pulled without interference from the jack.

However, I also provide that the post can be turned 90° to a substantially vertical, load-carrying position or "down" position. This is readily possible simply by disengaging the peg 20 form the hole 15, turning the peg 20—and therefore, necessarily also the post—until the peg will again slide into the hole 15, now rotated 90° from its "up" position. In this position, there will also be some substantial carrying of the load between the boss 12 and the peg 20, when the trailer weight settles onto the jack.

In order to retain the engagement of the peg 20 in the hole, I use a helical compression spring 21 enclosed in the hollow 13. One end of the spring engages the portion of the boss 12 in which the hole 15 is cut. The other end is held by a washer 22. A screw 23 extends through the washer 22 and the center of the spring 21 and is threaded into the square peg 20. Thus, if the peg 20 is pulled out of the hole 15, the movement acts to compress the spring 21. The spring is of such strength that forces developed by ordinary travel over the road will not be sufficient to move the peg 20 out of the hole 15.

Although I have described the peg 20 and hole 15 as square, it will be obvious that other shapes which are symmetrical at right angles would also be operative. For example, a cross-shape having equal arms of right angles to each other would be satisfactory as would an octagonal shape. Other shapes having flat sides, but being symmetrical at 90° angles may be used.

I prefer to proportion the spring 21 and the screw 23 such that when the spring is nearly fully extended, and when the peg 20 is fully inserted into the hole 15, the head of the screw 23 will abut the frame 11. In that position, any vibration or other motion will not tend to cause the screw 23 to turn and become unthreaded from the peg 20 because the screw cannot be moved out of its threads that far. It is then necessary to fully remove the plate 10 from the frame in order to get to the spring 21 and its fastenings.

It should also be noted that the tubular extension 17 is long enough so that even when the spring 21 is fully compressed, the extension 17 still is engaged with the boss 12, thus providing complete enclosure of the hollow 13 and the enclosed spring 21 within the hollow.

Vibration of another sort may be a problem. While the jack is supporting the trailer—particularly with smaller trailers, vibrations or other motion caused by wind, refrigerator mechanisms or any other cause may tend to cause the peg 20 to withdraw from the hole 15.

To avoid that problem, a pug 25 is inserted into an opening at the top surface of the peg 20. When the jack is vertical and as the weight of the trailer then shifts to the engagement between that peg 20 and the walls of the hole 15, the raised points 26 formed on the surface of the plug 25 will press into the surface of the hole 15 and thus create a nearly positive engagement which will prevent movement axially of the hole.

The use of the device is apparent from the foregoing description. Normally, as the trailer is pulled over the road, the jacks are carried in the "up" position. They are held there by engagement of the square peg 20 in the hole 15 and are kept there because of the bias of the spring holding the peg there. When the trailer is to be disconnected and supported by the jack, the post 16 and its attached parts are pulled against the bias of the spring 21 until the peg is free of the hole. At that point, the tubular extension 17 is free to turn on the round boss 12. The post 16 can then be turned to the "down" position where the peg 20 will again fit into the hole 15 as the spring 21 relaxes. Then the jack can be adjusted to carry the weight of the usual way and the towing vehicle disconnected and driven away. Thus, I have provided a convenient and easy means for holding the jack in its two common positions. The device is compact and well enclosed so that dirt or grease from the outside will not interfere with its operation. The device is usable on large semitrailers or small boat trailers and other sizes between. It is also resistant to collapse caused by vibration or the like.

I claim as may invention:

1. In combination with a trailer having a frame, means for adjustably fastening a load supporting jack to said trailer comprising pad means for attachment to said frame, mating means on said jack and on said pad means, said mating means being circular in cross section, whereby said jack can be rotated relative to said frame, said mating means being adapted to transmit a load from said frame to said jack, disengageable mating means on said pad means and said jack, said disengageable mating means including a boss on said pad means and a peg on said jack, said boss being formed to provide an opening adapted to receive said peg, both said peg and said boss including flat sides at right angles whereby said peg will fit into said opening in at least two positions spaced apart at a right angle, spring means engaged between said pad means and said jack adapted to hold said disengageable mating means releasably in engagement, friction causing means including a plug inserted into said peg, said plug having an exposed face having a plurality of raised points adapted to be pressed against a wall of said opening when said jack is supporting the load.

2. In combination with a trailer having a frame, means for adjustably fastening a load supporting jack to said trailer comprising pad means for attachment to said frame, mating means on said jack and on said pad means, said mating means being circular in cross section, whereby said jack can be rotated relative to said frame, said mating means being adapted to transmit a load from said frame to said jack, disengageable mating means on said pad means and said jack, and disengageable mating means including a boss on said pad means, and a square peg on said jack, said boss being formed to provide a square opening adapted to receive said peg, both said peg and said boss including flat sides at right angles whereby said peg will fit into said opening in at least two positions spaced apart at a right angle, spring means engaged between said pad means and said jack adapted to hold said disengageable mating means releasably in engagement.

3. In combination with a trailer having a frame, means for adjustably fastening a load supporting jack to said trailer comprising pad means for attachment to said frame, mating means on said jack and on said pad means, said mating means being circular in cross section, whereby said jack can be rotated relative to said frame, said mating means being adapted to transmit a load from said frame to said jack, disengageable mating means on said pad means and said jack, said disengageable means being symmetrical at 90° angles whereby said jack will be held releasably at positions 90° rotatably spaced, spring means engaged between said pad means and said jack adapted to hold said disengageable mating means releasably in engagement, said peg means including a boss on said pad means, said boss being formed to provide a hollow extending from the surface of the pad means into said boss, said boss also being formed to provide an opening, said opening forming part of said disengageable mating means, said spring means being enclosed in sad hollow and being engaged with said boss and connected to said jack through said opening.

4. The combination of claim 2 in which friction-causing means is disposed on said peg, said friction causing means being positioned to be pressed on by the wall of said opening when said jack is supporting the load.

5. The combination of claim 3 in which said disengageable mating means also includes a peg on said jack adapted to fit into said opening, and said spring being connected to said jack by a screw threadably engaged with said peg, and a washer on said screw adapted to hold said spring.

6. The combination of claim 2 in which said boss is formed to provide a hollow in communication with said opening, said spring means being disposed in said hollow, said spring means including a compression spring engaged with said boss at the base of said hollow and a screw threadably engaged with said peg, said screw having a head remote from said peg, said spring also being engaged with said head.

7. The combination of claim 3 in which said first named mating means include a tubular means on said jack adapted to mate slidably both axially and rotatably with said boss.

8. The combination of claim 7 in which said boss and said tubular means are of sufficient length axially so that the mating relationship is maintained throughout any axial travel permitted by said spring means.

* * * * *